(12) United States Patent
Okawa et al.

(10) Patent No.: US 6,635,849 B1
(45) Date of Patent: Oct. 21, 2003

(54) LASER BEAM MACHINE FOR MICRO-HOLE MACHINING

(75) Inventors: Tatsuki Okawa, Tokyo (JP); Yasuhiko Iwai, Tokyo (JP); Miki Kurosawa, Tokyo (JP); Masanori Mizuno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/914,779

(22) PCT Filed: Mar. 5, 1999

(86) PCT No.: PCT/JP99/01089

§ 371 (c)(1),
(2), (4) Date: Dec. 19, 2001

(87) PCT Pub. No.: WO00/53365

PCT Pub. Date: Sep. 14, 2000

(51) Int. Cl.[7] .................. B23K 26/38; B23K 26/067
(52) U.S. Cl. .................. 219/121.73; 219/121.7
(58) Field of Search ............ 219/121.7, 121.71, 219/121.73, 121.74, 121.75, 121.77

(56) References Cited

U.S. PATENT DOCUMENTS 5,521,628 A * 5/1996 Montgomery
5,719,372 A * 2/1998 Togari et al.
6,452,132 B1 * 9/2002 Fuse ........................ 219/121.7

FOREIGN PATENT DOCUMENTS

| DE | 195 11 393 A1 | 10/1996 | |
|---|---|---|---|
| EP | 0 884 128 A1 | 12/1998 | |
| GB | 2337720 A * | 12/1999 | |
| JP | 4-22190 | 2/1992 | ........... B23K/26/00 |
| JP | 6-242390 A * | 9/1994 | |
| JP | 7-124778 | 5/1995 | ........... B23K/26/08 |
| JP | 9-1363 | 1/1997 | ........... B23K/26/00 |
| JP | 10-34365 | 2/1998 | ........... B23K/26/00 |
| JP | 10-200269 | 7/1998 | ............ H05K/3/46 |

OTHER PUBLICATIONS

International Search Report, no publication date of PCT/JP99/01089.
German Patent and Trademark Office Official Action dated Feb. 24, 2003 for File No. 199 83 939.56–34.

* cited by examiner

Primary Examiner—Geoffrey S. Evans
(74) Attorney, Agent, or Firm—Sughrue Mion, PLLC

(57) ABSTRACT

The present invention relates to a laser beam machine having a laser oscillator, for generating a laser beam; a light path system, including galvano mirrors and an fθ lens that form a light path along which the laser beam emitted by the laser oscillator is guided to an object; and a diffractive optical element, located along the light path leading from the laser oscillator to the galvano mirrors.

7 Claims, 11 Drawing Sheets

LASER BEAM MACHINE FOR MICRO-HOLE MACHINING

TECHNICAL FIELD

The present invention relates to a laser beam machine, and relates in particular to a laser beam machine used, for example, for high-speed micro-hole machining.

BACKGROUND ART

A common, conventional laser beam machine for micro-hole machining is shown in FIG. 11. The machine in FIG. 11, as provided, emits a pulse laser beam 2 to impinge on object 1 that is horizontally arranged on an XII table 14, and comprises: a laser oscillator 3, for generating the pulse laser beam 2; several bend mirrors 4, for reflecting the laser beam 2 and guiding the beam 2 along a light path; galvano mirrors 5 (two galvano mirrors 5a and 5b in FIG. 11), for reflecting the laser beam 2 at an arbitrary angle as instructed by a controller 10; a galvano scanner 6, for driving the galvano mirrors 5; an fθ lens 7, for correcting the angle of the laser beam 2 received from the galvano mirrors 5 so it is be parallel to the axial direction of the light path, and for guiding the laser beam 2 so it is perpendicular to the object 1; a CCD camera 8, used for the display of the results obtained; a Z axis table 9, on which the galvano scanner 6, the fθ lens 7 and the CCD camera 8 are mounted and which is moved in direction Z in order to adjust the distance from the object 1; and the controller 10, for controlling this driving system. Compared with the laser beam machining of sheet metal performed at a rate of 500 holes per second, the laser beam machine provides higher speed machining by using the galvano scanner 6, which quickly positions the laser beam 2 perpendicular to the object 1, the galvano mirrors 5, the fθ lens 7 and the pulse laser oscillator 3, which oscillates a laser beam for an extremely short period of time.

An explanation will now be given for the micro-hole machining performed using this machine. The pulse laser beam 2, which is output by the laser oscillator 3 in accordance with a frequency and an output value that are set by the controller 10, is guided by the several bend mirrors 4 to the galvano mirrors 5a and 5b, which are attached to the galvano scanner 6. Then, the laser beam 2 is reflected by the galvano mirrors 5a and 5b, which are secured at arbitrary angles by the galvano scanner 6, and transmitted to the fθ lens 7. The laser beam 2, incident to the fθ lens 7, is focused on the object 1. Since the laser beam 2 traverses various incident angles immediately before entering the fθ lens 7, at the fθ lens 7 the angular direction of the laser beam Z is corrected so that it is perpendicular to the object 1.

The controller 10, to control the machining for a shape that is input to it in advance, adjusts the timing whereat the laser beam 2 is output by the laser oscillator 3, and the angles of the galvano mirrors 5a and 5b. During the machining, normally, a hole is produced each time the laser pulse irradiates the object 1; however, if the strength of the laser beam 2 is inadequate for the material of which the object 1 is composed, to open a deep hole a method is employed whereby several pulses are emitted for each irradiated point. Further, since the galvano mirrors 5a and 5b that are used can provide only a limited scanning range for the laser beam 2, when the machining of a portion of a predetermined shape is completed, the object 1 is moved to a succeeding scan area by shifting the XY table 14, and the galvano scanner 6 is again driven to continue the machining of the shape. This procedure is used to guide the laser beam 2 to arbitrary locations to perform micro-hole machining.

To improve the above described processing, three methods can be used to perform higher speed machining: a method used for an individual machine to improve unit hour productivity by increasing the galvano scanner driving speed; a method used for the generation by the pulse laser oscillator of a higher power laser beam at a higher oscillation frequency; and a method used to increase the speed at which the XY table is moved.

As a consequence of the recent dramatic growth of the micro-hole machining market, requested machining speeds have been increased by several to several tens of times within a short period. Therefore, it is anticipated that a galvano scanner that can be driven at high speed and a laser oscillator that can generate a high power pulse laser beam will be developed shortly, and that there is an urgent necessity for the development without delay of a technique for drastically improving machining speed and for applying it for the manufacture of products. However, while taking into account the present situation wherein the capabilities of the XY table have neared their limits, it is very difficult to devise a method for increasing the positioning speed of a laser beam machine that can reduce the machining time to ⅕, ⅒ or less that which is presently available, as is requested by the market.

Further, were a method devised whereby multiple machine heads were prepared for one oscillator and a laser beam emitted by the oscillator would be branched at several steps by using translucent mirrors, a huge light path system would have to be designed and light path adjustments would become complicated.

A diffractive optical element (hereinafter referred to as a DOE, as needed) is an optical element that can subdivide into a designated number of beams or patterns, a beam that is received from a diffractive grid provided on a surface. While generally only one portion can be machined by one oscillation of a laser beam, a DOE that is designed to subdivide a laser beam to obtain, for example, three beams, need only be inserted into the above described laser beam machine to perform micro-hole machining for three portions that could be processed at the same time using the one oscillation. A DOE is also called a holographic optical element (HOE).

A DOE that subdivides a laser beam to obtain a desired number of beams and patterns can be designed, and can be used to increase the machining speed comparatively easily. In this fashion, the above problem presented by the need to increase the machining speed can be resolved.

However, when a DOE is inserted into a light path system, depending on the insertion location, the design specifications can not be demonstrated. In such a case, for example, a mask must be employed for an image transfer optical system in order for the power of a laser beam to be efficiently employed. However, when the DOE is inserted in front of the mask, the mask adversely affects the spectral pattern. And when, for example, the DOE is inserted immediately behind the galvano mirror and immediately in front of the fθ lens, the laser beam will enter the DOE obliquely, and the spectral pattern will be affected by a change in the refractive index. Thus, a complicated DOE design and a complicated galvano scanner control means are required when the incident angle and the incident area are taken into account. And were a DOE inserted, for example, immediately behind an fθ lens, the DOE would have to be large enough to adequately cover the scan area provided by a galvano mirror, and the manufacturing costs would be enormous. In addition, means for protecting the surface of a DOE surface from dust and the sputter that is generated during machining would be required, increasing the manufacturing costs even further.

For a laser beam that passes through a galvano mirror and an fθ lens, an instructed value does not match a machining position due to differences in the distance between the galvano mirror and the fθ lens. Thus, to correct this shift, a position correction must be provided by a program. Further, since the reflection angle of a galvano mirror is changed slightly by the ambient temperature, it is preferable that a machine be used in an air conditioned room. For if the location whereat the laser beam machine is used is not air conditioned, or if the air conditioning is turned off at night, the correction value must be changed frequently. As a method for performing the position correction and for changing the correction value, an automatic correction method is available that uses a CCD camera. According to this method, the coordinates of a hole, which is formed by a laser beam in accordance with a pattern that is written in advance in the correction program, are identified by the CCD camera, and the position shift is detected between the instructed value and the coordinate value of the hole measured by the CCD camera. Then, a correction for the shifting distance is calculated using the position of the hole in the scan area, thereby providing a correction for the entire scan area. However, since in a laser beam machine equipped with a DOE a laser beam branches to form a pattern at the point of focus, the program must be corrected for each DOE pattern when a CCD camera is used to identify the position of a hole. Thus, a great deal of labor is required to correct programs for individual machines.

In a laser beam machine wherein a DOE is provided along the light path, the laser beam that passes through the DOE is branched with an intensity that slightly varies, depending on the manufacturing accuracy of the DOE. Thus it is preferable that such variances be as small as possible; however, in actuality, it is impossible to completely remove variance occasioned by the manufacturing process or by the effect produced by low-order diffractive light. Therefore, when machining is performed by using a DOE, the diameter of the hole obtained varies in proportion to the variance in the spectral strength.

And when a laser beam is emitted several times at the same positions, or is continuously emitted for an extended period of time, the diameters of the thus produced holes are proportional to the strength of the energy applied, so that equalizing the diameters of the machined holes is not possible.

Further, when a laser beam passes through a DOE, in addition to a required pattern, high-order diffractive light is branched at the same time as noise. The noise can be reduced, to a degree, by adjustments made during the manufacturing process used for the DOE or by the machining conditions set for each object, but it can not be completely removed. Further, when a laser beam is branched to provide only a small number of beams, the spectral strength of noise is lower than the spectral strength produced for a necessary pattern, and is usually not a barrier in the machining process. However, when the number of branched beams is increased and the design value for the spectral strength of each beam is reduced, or when the spectral strength of the pattern nears that of the noise due to the DOE manufacturing problem, another problem arises in that an unnecessary hole may be formed at a location other than the necessary pattern.

To resolve the above described problems, it is one objective of the present invention to provide a laser beam machine that can machine micro holes at a higher speed and more accurately than a conventional laser beam machine.

DISCLOSURE OF THE INVENTION

According to the present invention, a laser beam machine comprises:
 a laser oscillator, for generating a laser beam;
 a light path system, including galvano mirrors and an fθ lens that form a light path along which the laser beam emitted by the laser oscillator is guided to an object; and
 a diffractive optical element, located along the light path leading from the laser oscillator to the galvano mirrors.

Therefore, a laser beam machine having a simple configuration can be produced that can simultaneously and accurately machine multiple holes at high speed by using the diffractive optical element.

The laser beam machine of this invention further comprises:
 detachment means, for detaching the diffractive optical element from a predetermined position along the light path.

Therefore, the positioning of the galvano mirrors can be corrected easily, while the diffractive optical element is removed from the light path, and multiple types of diffractive optical elements can be appropriately used and can easily cope with multiple types of machining patterns.

The laser beam machine of this invention further comprises:
 adjustment means, for adjusting the posture of the diffractive optical element located along the light path.

Therefore, the posture of the diffractive optical element can be adjusted so that the laser beam enters perpendicularly, and an appropriate diffractive angle can be obtained.

In the laser beam machine of this invention, for laser beams that are obtained by branching the laser beam using the diffractive optical element and are focused by the fθ lens, the diameters of the laser beams at the focal points of focus are controlled by adjusting an image transfer optical system that is located between the laser oscillator and the diffractive optical element along the light path.

Therefore, in a laser beam machine including the diffractive optical element, at the points of focus, the diameters of the laser beams obtained by branching can be uniformly adjusted by the diameter of a mask that is provided as an element of the image transfer optical system. Thus, machining results consonant with the material of the object and the diameter of a hole can be easily obtained.

BEST MODE FOR CARRYING OUT THE INVENTION

Embodiment 1

Figure 1:
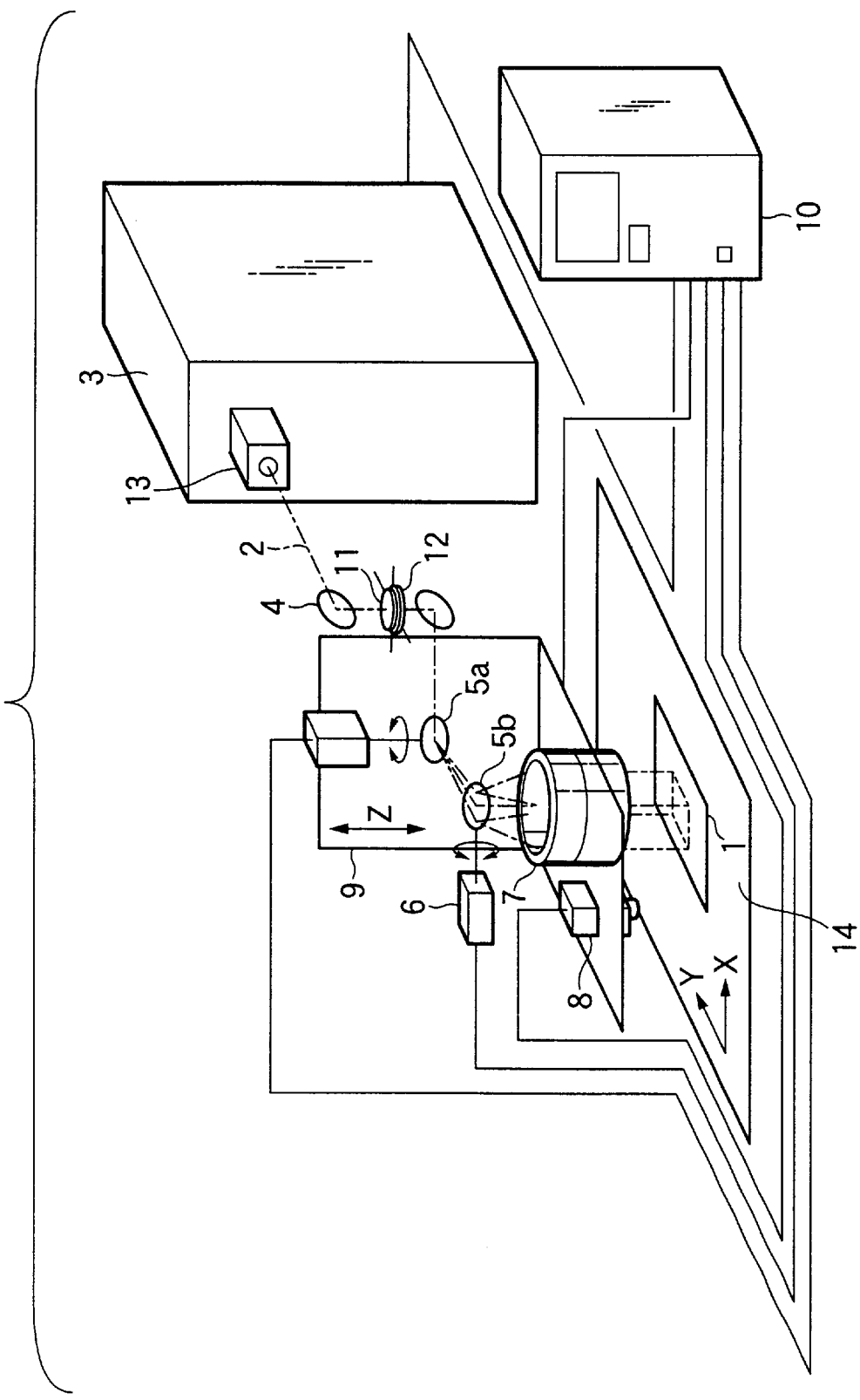
FIG. 1 is a schematic diagram showing the configuration of a laser beam machine according to one embodiment of the present invention.

In FIG. 1, a laser beam machine according to a first embodiment of the invention is shown. In FIG. 1, a laser beam 2 is generated by a laser oscillator 3, and is emitted through a shutter 13 attached to the oscillator 3. The laser beam 2 is guided to a DOE 11 held by a holding device 12 mounted between several bend mirrors 4 located along a light path. The laser beam 2 is branched to describe a predetermined pattern by a diffractive grid included in the DOE 11. The branched laser beams 2 are guided by the bend mirrors 4 to galvano mirrors 5a and 5b that are held by a galvano scanner 6. The laser beams 2 are reflected by the galvano mirrors 5a and 5b, which are scanned at arbitrary angles by the galvano scanner 6, and enter an fθ lens 7 at arbitrary incident angles. The laser beams 2 incident to the fθ lens 7 are corrected and output so as to enter an object 1 perpendicularly while focused in accordance with the focal length set for the fθ lens 7. With this arrangement, at the points of focus, an arbitrary pattern can be formed on the object 1.

Figure 2:
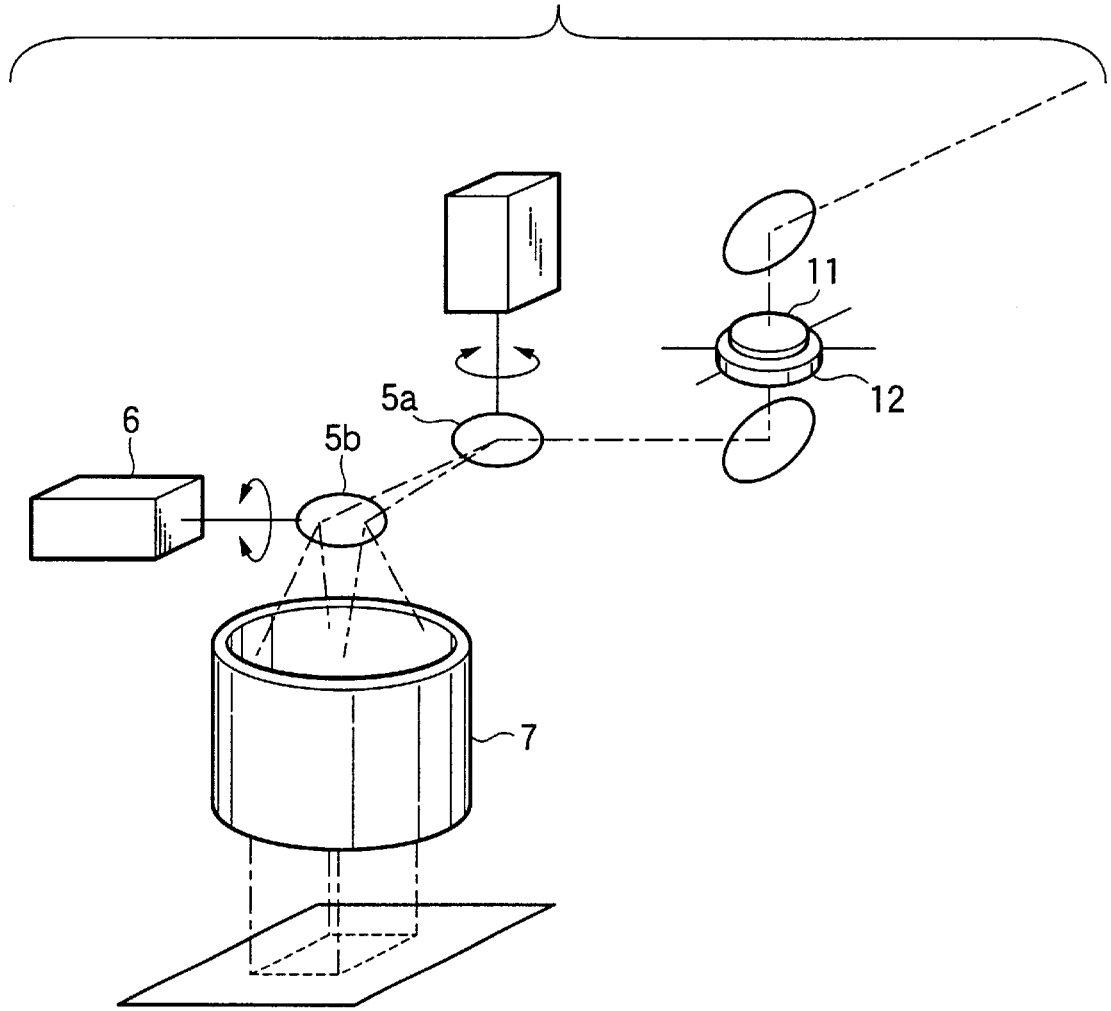
FIG. 2 is an enlarged diagram showing the essential portion, including a DOE and an fθ lens, of the laser beam machine in FIG. 1.

FIG. 2 is an enlarged diagram showing the essential portion of a light path system used for this embodiment. In FIG. 2, a DOE 11 is inserted nearer the oscillator 3 than the galvano mirror 5a. The laser beams 2 branched by the DOE 11 are condensed and strike the object 1 via the galvano mirrors 5a and 5b and the fθ lens 7.

Figure 3:
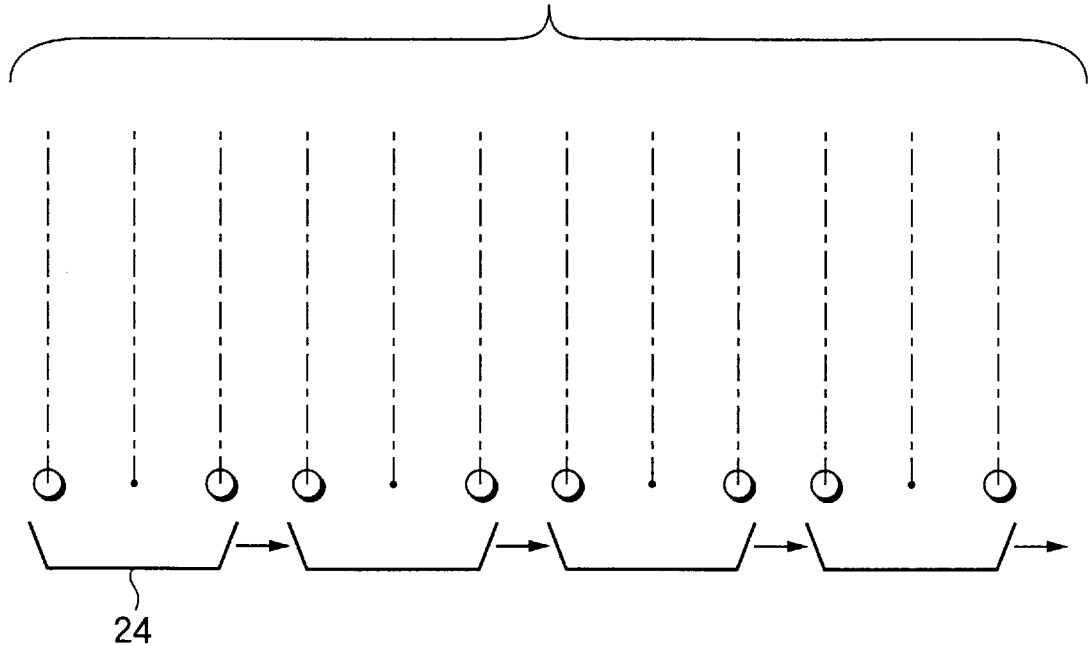
FIG. 3 is a diagram for explaining the common machining method.
Figure 4:
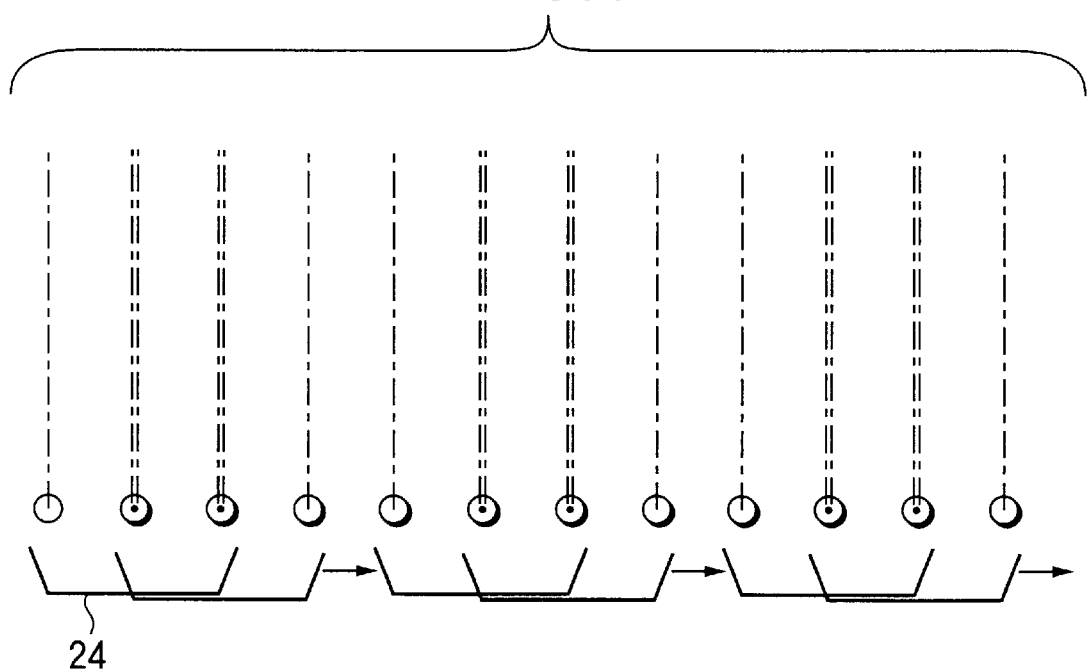
FIG. 4 is a diagram showing a machining method according to the embodiment of the present invention.

At this time, normally, as is shown in FIG. 3, after the machining at one point has been completed, machining would next be performed by moving the object 1 a distance equivalent to a pattern 24. During the process performed in this embodiment, however, as is shown in FIG. 4, the object 1 is moved by shifting it a distance equivalent to one hole, and machining is performed while part of the pattern 24 overlaps the portion that was previously machined. Then, the object is moved a distance equivalent to the pattern 24, and the partially overlapped machining is repeated. With this machining method, using single beam irradiation, the diameters of the obtained holes would be varied due to non-uniform spectral strengths; however, since the patterns are partially overlapped by moving the object a distance equivalent to one hole, and the object is again irradiated by beams, the uniformity of the diameters of the holes can be improved.

Figure 5:
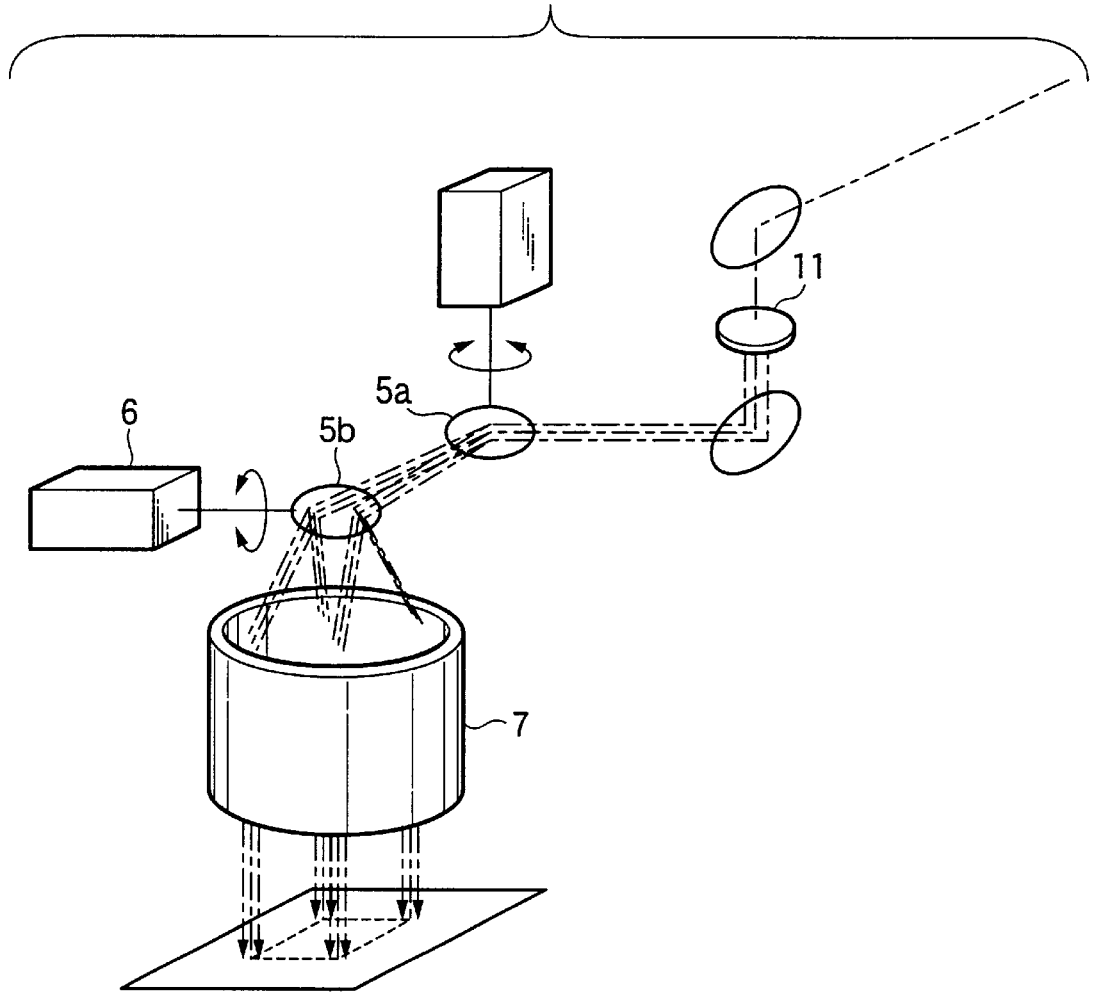
FIG. 5 is a schematic diagram for explaining the location whereat the DOE is positioned according to the embodiment of the present invention.
Figure 6:
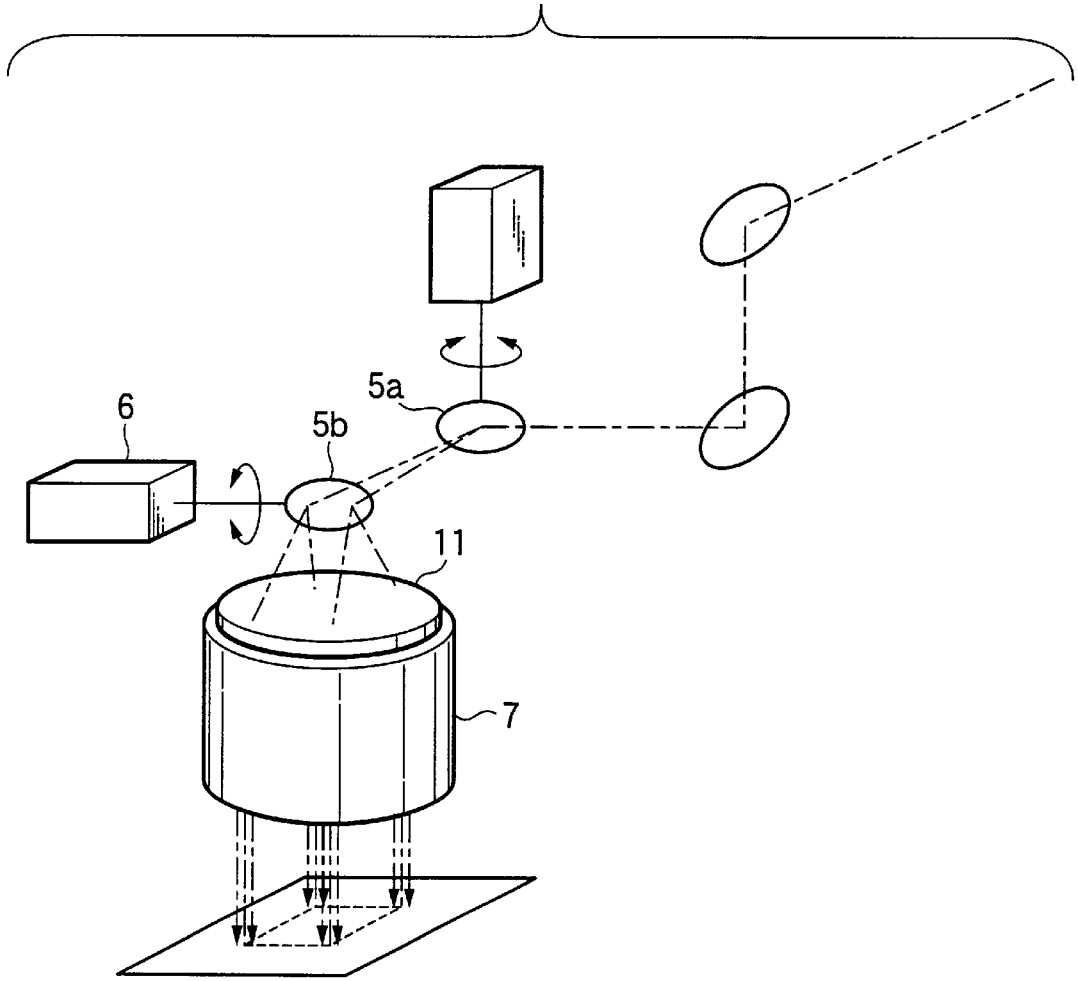
FIG. 6 is a schematic diagram for explaining a comparison example for the positioning of the DOE.
Figure 7:
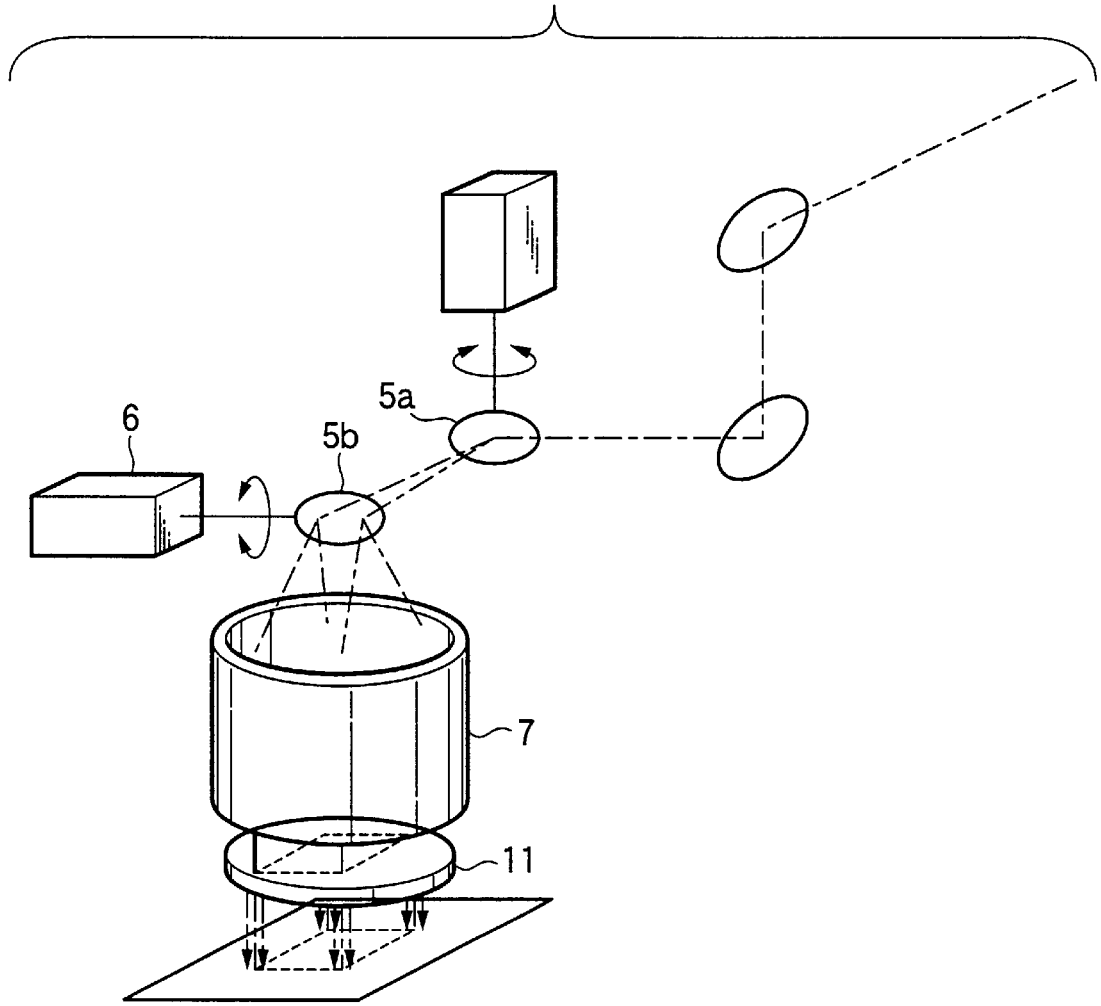
FIG. 7 is a schematic diagram for explaining another comparison example for the positioning of the DOE.

FIGS. 5, 6 and 7 are schematic diagrams for describing locations whereat the DOE 11 is positioned along the light path. While there are various locations whereat the DOE could be inserted in the light path, it is preferable that, as is shown in FIG. 5, the DOE 11 be located in front of the galvano mirror 5a. When, for example, the DOE 11 is inserted between the galvano mirror 5b and the fθ lens 7, as is shown in FIG. 6, the laser beam reflected by the galvano mirror 5b enters the DOE 11 at a specific angle. Since the DOE 11 is designed to receive the laser beam perpendicularly, if the laser beam enters obliquely, the refractive index is changed, so that a predetermined spectral shape and strength can not be obtained. Therefore, high-level calculations are required to design the DOE 11 while taking the incident angle into account, and currently these calculations are extremely difficult.

Further, when, for example, the DOE 11 is inserted along the light path following the fθ lens 7, as is shown n FIG. 7, the DOE 11 has to be large enough to accommodate laser beams across the entire area scanned by the galvano mirror 5b. Further, since the laser beams that pass through the DOE 11 are focused by the fθ lens 7, the DOE 11 tends to be affected thermally, so that a function, such as is provided by a cooling device, for reducing the thermal affect is needed.

Embodiment 2

Figure 8:
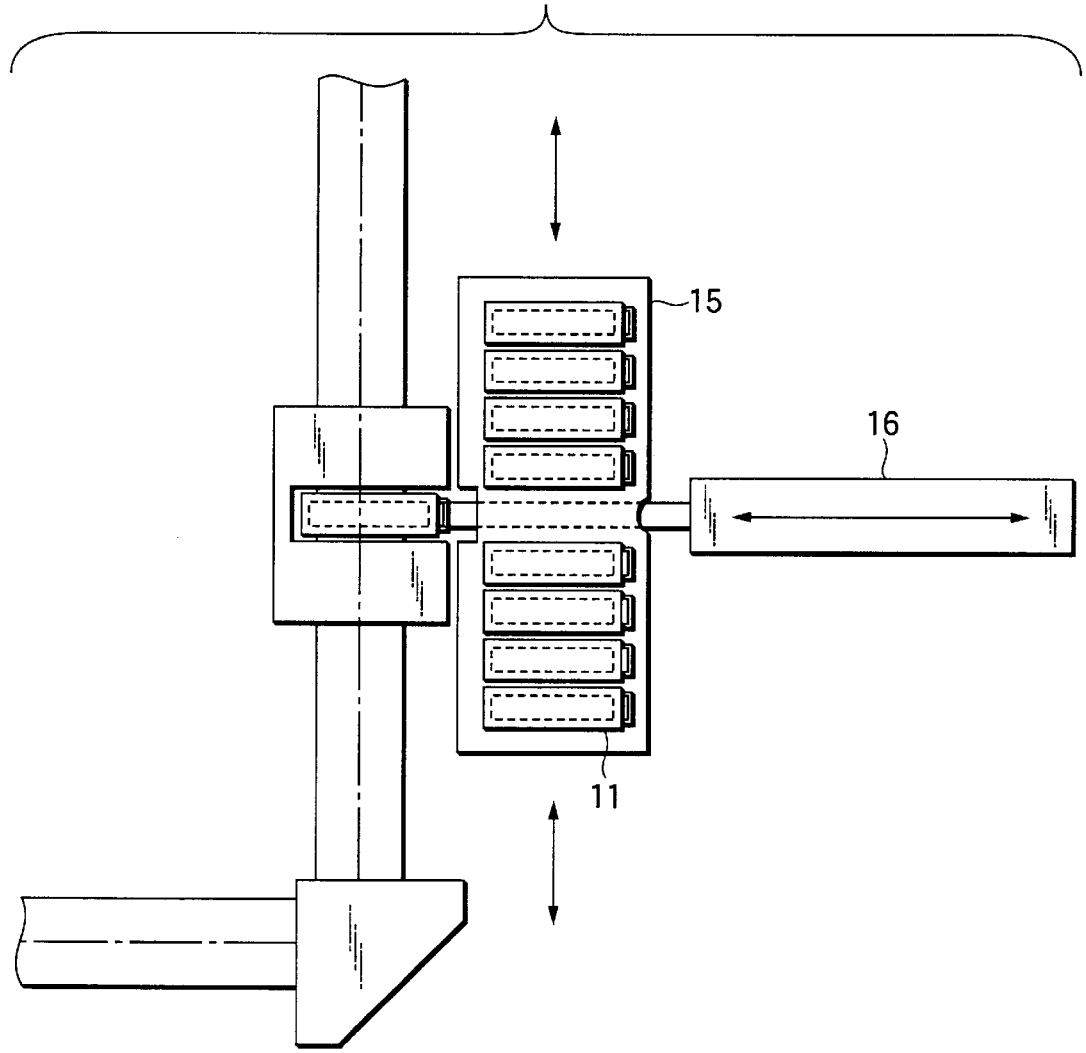
FIG. 8 is a schematic diagram showing the configuration of a DOE detaching/holding device according to another embodiment of the present invention.

In FIG. 8 is shown a detaching/holding device that can easily insert or exchange a DOE in the light path system according to the first embodiment. The detaching/holding device in FIG. 8 has a mechanism for automatically exchanging DOEs 11 stored in a stack unit 15 using an exchanger arm 16. When a DOE is not used for the adjustment of the light path for the alignment of the galvano mirrors, the DOE can be removed from the light path. A detaching mechanism may be employed with which an operator can manually exchange DOEs as needed.

Since the shapes of the DOEs do not vary, several types of DOEs, including one having a diffractive grid for branching a laser beam to describe a specific pattern, are prepared, and are exchanged as needed, so that the machining of an arbitrary pattern can more appropriately be coped with.

Further, to automatically correct galvano mirrors, the following matters are requested: the CCD camera should easily recognize the machining results; the need for a correction for a program for each DOE pattern should be removed; and a complicated apparatus and control should be avoided when a laser beam is emitted while being rotated around the light axis, due to the posture of an attached DOE, and the machining results are inclined relative to the coordinate axis of the XY table, so that for recognition by the CCD camera and program correction, a rotation axis correction is required in addition to X coordinate and Y coordinate corrections. Therefore, it is preferable that only one hole be provided in the viewing field of a CCD camera, so that a laser beam that is not branched is necessary, and that preferably the DOE be removed from the light path when the correction is made.

Embodiment 3

Figure 9:
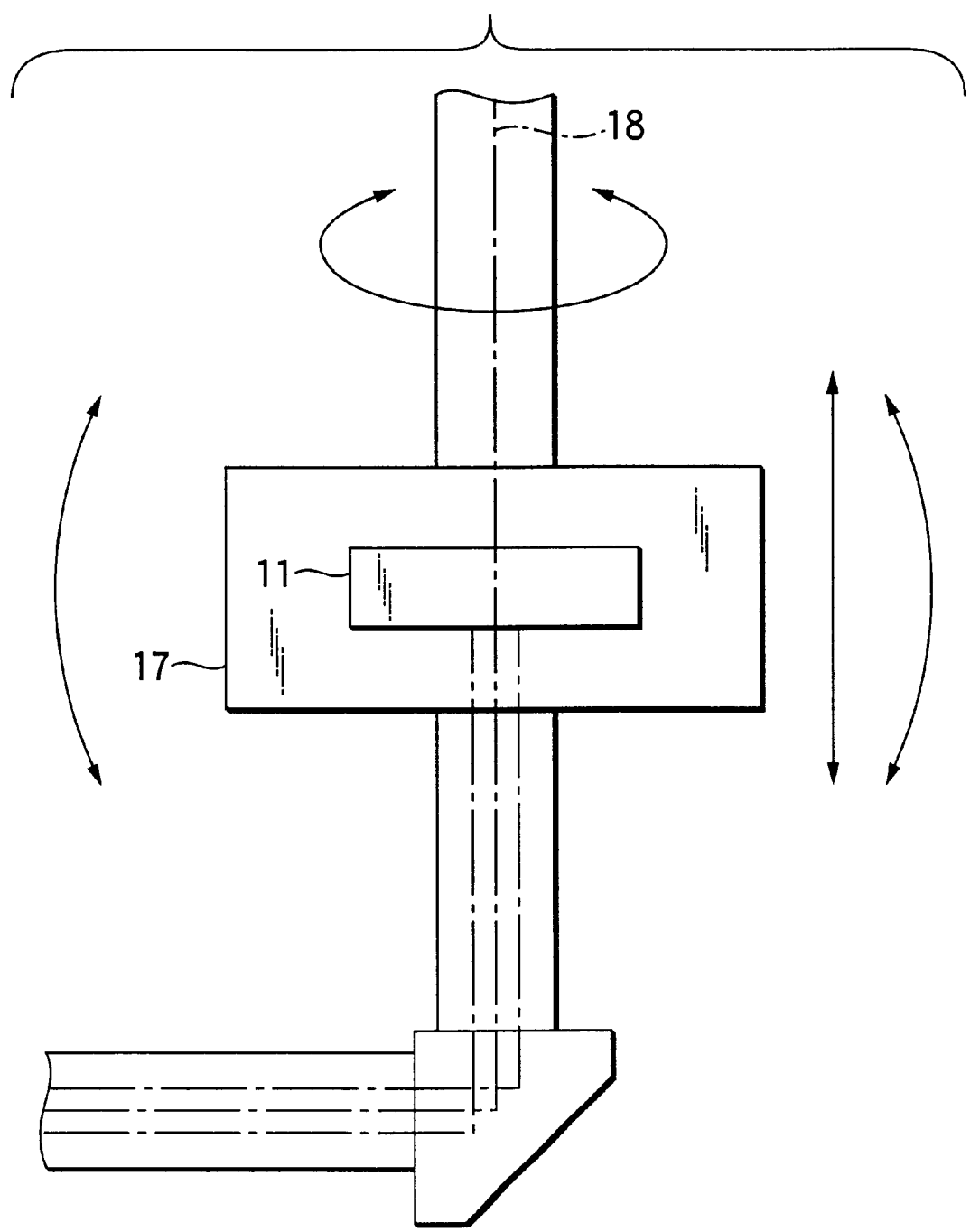
FIG. 9 is a schematic diagram showing the arrangement of a DOE posture adjustment device according to an additional embodiment of the present invention.

In FIG. 9 is shown a posture adjustment device that can easily adjust the posture of a DOE in the light path system of the first embodiment. The accuracy of the spectral pattern at the point of focus is greatly affected by the accuracy with which the DOE was manufactured. Further, since the distance between the DOE and the point of focus also affects the accuracy of the spectral pattern, in order to adjust for an error in the focal length set for the lens, a holding device 17 for posture adjustment includes a mechanism for performing a vertical adjustment to correct for the error along a light axis 18. In addition, while a lower beam that will strike the object is emitted via the galvano mirrors, the spectral pattern is inclined relative to the XY coordinates of the machine table, depending on the angles at which the galvano mirrors are attached. Therefore, the holding device 17 for posture adjustment includes a mechanism for rotating the DOE 11 around the light axis 18. In addition, to obtain the optimal diffractive angle, it is preferable that the laser beam enter the DOE 11 perpendicularly. Thus, the holding device 17 for posture adjustment also includes a mechanism for adjusting the DOE 11 so it is perpendicular to the light axis 18.

Embodiment 4

Figure 10:
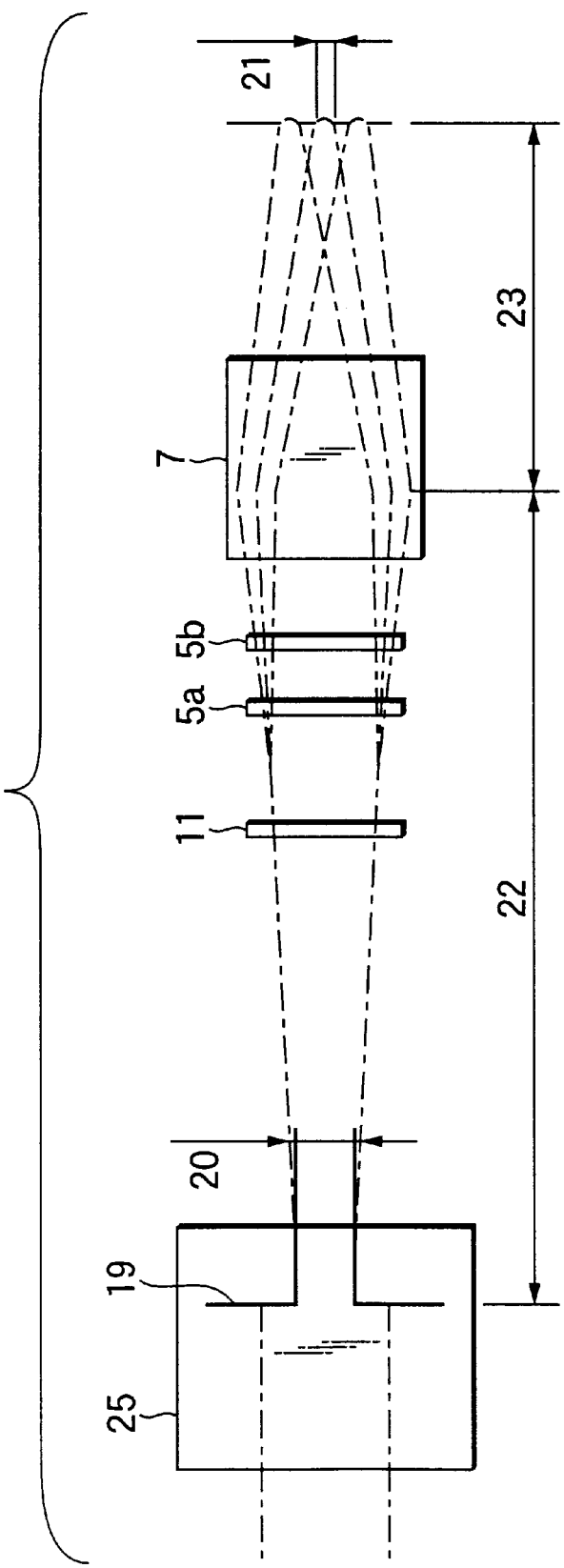
FIG. 10 is a schematic diagram showing the structure of a light path according to a further embodiment of the present invention.
Figure 11:
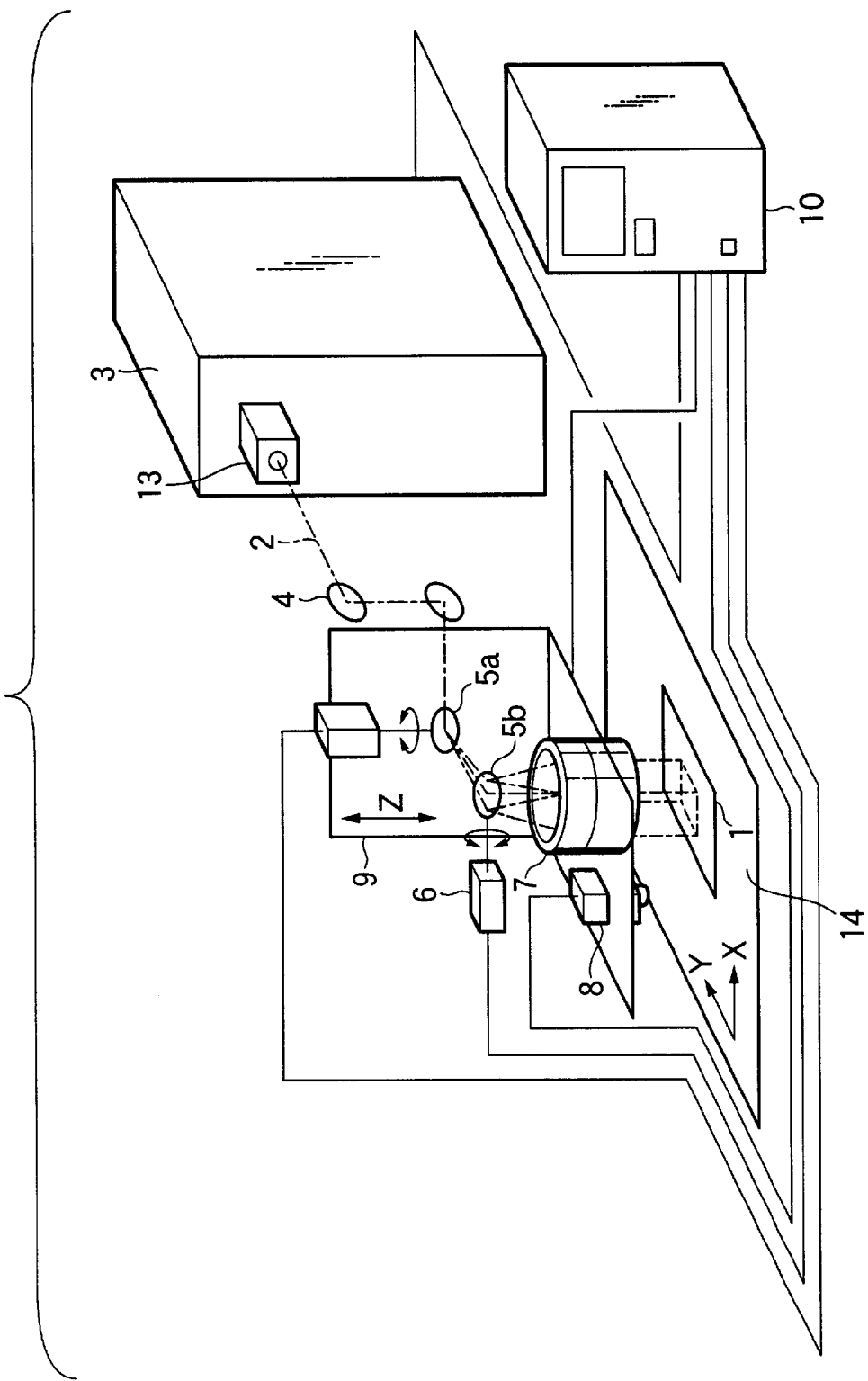
FIG. 11 is a schematic diagram showing the configuration of a conventional, common laser beam machine for microhole machining.

In FIG. 10 is shown a light path system wherein an image transfer optical system 25 equipped with a mask adjustment mechanism is positioned in front of the DOE 11 along the light path in the first embodiment. In the image transfer optical system 25, by adjusting a diameter 20 of a mask 19, a beam diameter 21 at the point of focus is controlled using the ratio of a distance 22 between the mask 19 and the fθ lens 7 to a focal length 23 set for the fθ lens 7. Then, the beam diameter determined by the mask 19 can be transferred to the object 1. This embodiment is an example of a light path system that includes a function for adjusting, to an arbitrary size, the diameters at the points of focus of the laser beams that are provided by the DOE 11.

In the above explanation, this invention has been used for micro-hole machining; however, the invention can also be applied for other laser machining purposes.

Industrial Applicability

As is described above, the laser beam machine of this invention is appropriate for industrial use, such as for micro-hole machining, for which high machining accuracy is a prerequisite.

What is claimed is:

1. A laser beam machine comprising:

a laser oscillator, for generating a laser beam;

a light path system, including galvano mirrors and an fθ lens that form a light path along which said laser beam emitted by said laser oscillator is guided to an object; and a diffractive optical element, located along said light path leading from said laser oscillator to said galvano mirrors, wherein laser beams obtained by branching said laser beam at said diffractive optical element are condensed via said galvano mirrors and said fθ lens to said object, and wherein said diffractive optical element generates a machining pattern.

2. A laser beam machine according to claim 1, further comprising:

detachment means, for detaching said diffractive optical element from a predetermined position along said light path.

3. A laser beam machine according to claim 1, further comprising:

adjustment means, for adjusting the posture of said diffractive optical element located along said light path.

4. A laser beam machine according to claim 1, wherein, for laser beams that are obtained by branching said laser beam using said diffractive optical element and are focused by said fθ lens, the diameters of said laser beams at the focal points of focus are controlled by adjusting an image transfer optical system that is located between said laser oscillator and said diffractive optical element along said light path.

5. The laser beam machine according to claim 4, wherein said image transfer optical system comprises a mask, and a beam diameter at a point of focus is controlled using a ratio of a distance between the mask and the fθ lens to a focal length set for the fθ lens.

6. The laser beam machine according to claim 1, wherein the diffractive optical element is a holographic optical element.

7. The laser beam machine according to claim 6, wherein the holographic optical element has a two-dimensional pattern.

* * * * *